United States Patent
An et al.

(10) Patent No.: US 12,221,157 B2
(45) Date of Patent: Feb. 11, 2025

(54) REAR VEHICLE BODY STRUCTURE

(71) Applicants: Hyundai Motor Company, Seoul (KR); Kia Corporation, Seoul (KR)

(72) Inventors: Yong Dok An, Anyang-si (KR); Jong Gwan Yun, Busan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 317 days.

(21) Appl. No.: 17/945,465

(22) Filed: Sep. 15, 2022

(65) Prior Publication Data

US 2023/0399050 A1  Dec. 14, 2023

(30) Foreign Application Priority Data

Jun. 8, 2022  (KR) .................. 10-2022-0069678

(51) Int. Cl.
*B62D 21/11*  (2006.01)
*B62D 21/15*  (2006.01)

(52) U.S. Cl.
CPC ............ *B62D 21/11* (2013.01); *B62D 21/152* (2013.01)

(58) Field of Classification Search
CPC .... B62D 21/11; B62D 21/152; B62D 27/023; B62D 29/008; B62D 25/087; B62D 25/088; B62D 25/02; B62D 27/026; B62D 27/065; B60Y 2306/01
See application file for complete search history.

(56) References Cited

U.S. PATENT DOCUMENTS

| | | | | |
|---|---|---|---|---|
| 10,086,881 B2* | 10/2018 | Kim | ................. | B62D 25/08 |
| 10,246,133 B2* | 4/2019 | Cha | ................. | B62D 21/152 |
| 10,899,395 B2* | 1/2021 | Yoo | ................. | B60R 19/03 |
| 11,358,645 B2* | 6/2022 | Murata | ................. | B62D 21/155 |
| 2015/0021892 A1* | 1/2015 | Moss | ................. | B62D 27/023 228/101 |
| 2015/0069779 A1* | 3/2015 | Morris | ................. | B62D 27/065 296/35.1 |
| 2017/0043810 A1* | 2/2017 | Kim | ................. | B62D 27/023 |
| 2018/0148097 A1* | 5/2018 | Cha | ................. | B62D 27/065 |
| 2020/0086922 A1* | 3/2020 | Yamada | ................. | B62D 25/088 |

FOREIGN PATENT DOCUMENTS

| | | | | |
|---|---|---|---|---|
| CN | 106364569 A | * | 2/2017 | ............ B62D 21/03 |
| CN | 206663646 U | * | 11/2017 | ......... B29C 45/1418 |
| EP | 3686088 A1 | * | 7/2020 | ......... B62D 21/152 |
| KR | 20160150517 A | * | 12/2016 | |
| KR | 20170070749 A | * | 6/2017 | |

OTHER PUBLICATIONS

JP 7031542 B2 with English translation (Year: 2022).*

* cited by examiner

*Primary Examiner* — Lori Lyjak
(74) *Attorney, Agent, or Firm* — SLATER MATSIL, LLP

(57) ABSTRACT

A rear vehicle body structure is disclosed. The rear vehicle body structure according to an embodiment of the present invention disclosed includes rear side members respectively disposed along a vehicle body front-rear direction on both sides of a vehicle body rear portion, and each of the rear side members may include a plurality of suspension mounting parts formed to mount the rear suspension and a plurality of radial ribs formed radially from each of the plurality of suspension mounting parts therein.

18 Claims, 7 Drawing Sheets

REAR VEHICLE BODY STRUCTURE

CROSS-REFERENCE TO RELATED APPLICATIONS

This application claims priority to and the benefit of Korean Patent Application No. 10-2022-0069678, filed in the Korean Intellectual Property Office on Jun. 8, 2022, the entire contents of which are incorporated herein by reference.

TECHNICAL FIELD

An embodiment of the present invention relates to a rear vehicle body structure.

BACKGROUND

A structure for coping with a reduction in weight of a vehicle body is emphasized as a solution for improving fuel economy of a vehicle. Therefore, development has been actively conducted on a vehicle body structure capable of improving strength and rigidity and implementing a reduction in weight while satisfying regulations that have become strict in vehicle industries.

In general, a rear portion of the vehicle body structure (hereinafter referred to as 'a rear vehicle body') is provided with a rear side member. The rear side member extends along the length direction of the vehicle, and is disposed on the left and right sides respectively along the width direction of the vehicle.

In such a rear vehicle body, a rear suspension is mounted to the rear side member. Furthermore, the rear side member of the rear vehicle body is not manufactured in the form of a straight line along the length direction of the vehicle in order to avoid interference with the drive shaft.

Therefore, in the rear vehicle body structure according to the conventional art, there is a possibility that the load input from the rear suspension and the load input during the rear collision of the vehicle may not be transmitted and distributed smoothly.

To prevent this, the rear vehicle body structure according to the conventional art is provided with separate reinforcement members mounted on the rear side member to distribute the crash load while reinforcing the input part of the rear suspension.

However, since the rear vehicle body structure according to the conventional art requires the separate reinforcing parts, it may cause an increase in the number of parts, the weight, and the manufacturing cost of the vehicle body.

In addition, the rear vehicle body structure according to the conventional art has a limit in increasing the coupling strength of the rear suspension and the dispersing performance of the crash load even when the separate reinforcement parts ae mounted on the rear side member.

The above information disclosed in this background section is only for enhancement of understanding of the background of the invention, and therefore it may contain information that does not form the prior art that is already known to a person of ordinary skill in the art.

SUMMARY

An embodiment of the present invention relates to a rear vehicle body structure. More particularly, the present invention relates to a rear vehicle body structure adapted to mount a rear suspension.

Embodiments of the present invention are to provide a rear vehicle body structure capable of increasing the coupling strength of the vehicle body rear structure and the dispersing performance of the rear crash load with a simple configuration.

A rear vehicle body structure according to an embodiment of the present invention includes rear side members respectively disposed along a vehicle body front-rear direction on both sides of a vehicle body rear portion, and each of the rear side members includes a plurality of suspension mounting parts formed to mount the rear suspension and a plurality of radial ribs formed radially from each of the plurality of suspension mounting parts therein.

Also, in the rear vehicle body structure according to an embodiment of the present invention, each of the rear side members may be formed of an aluminum material.

Also, in the e rear vehicle body structure according to an embodiment of the present invention, each of a plurality of suspension mounting parts may include a mount boss that crosses the inside of the rear side member along the vehicle width direction and is connected to the inner surface of the rear side member.

Also, in the e rear vehicle body structure according to an embodiment of the present invention, each of the rear side members may include a non-linear section formed non-linearly in the front portion along the vehicle body front-rear direction, and a linear section that is formed in a straight line on the rear portion along the front-rear direction of the vehicle body and is connected to the non-linear section.

Also, in the rear vehicle body structure according to an embodiment of the present invention, a plurality of radial ribs may be radially connected to a plurality of suspension mounting parts from a predetermined center point to form the non-linear section.

Also, in the rear vehicle body structure according to an embodiment of the present invention, each of the rear side members may include a plurality of non-linear ribs formed along the vehicle body front-rear direction inside the non-linear section and connected to a plurality of radial ribs, and a plurality of linear ribs formed along the vehicle body front-rear direction inside the linear section and connected to a plurality of radial ribs and a plurality of non-linear ribs.

Also, in the rear vehicle body structure according to an embodiment of the present invention, a plurality of radial ribs, a plurality of non-linear ribs, and a plurality of linear ribs may be connected through a plurality of vertical ribs along a vertical direction.

Also, in the rear vehicle body structure according to an embodiment of the present invention, a plurality of radial ribs, a plurality of non-linear ribs, a plurality of linear ribs, and a plurality of vertical ribs may be disposed to be spaced apart from each other through a plurality of rib spaces.

Also, in the rear vehicle body structure according to an embodiment of the present invention, a plurality of rib spaces may be connected through rib holes formed in each of a plurality of radial ribs, a plurality of non-linear ribs, a plurality of linear ribs, and a plurality of vertical ribs.

Also, in the rear vehicle body structure according to an embodiment of the present invention, the linear section may be connected with a rear crash box disposed on the rear portion of the vehicle body along the vehicle body front-rear direction.

Also, in the rear vehicle body structure according to an embodiment of the present invention, the rear crash box may be inserted to the linear section as a male and female type and coupled to the linear section through an adhesive and a plurality of screws.

Also, in the rear vehicle body structure according to an embodiment of the present invention, the rear crash box may include a plurality of horizontal ribs formed therein along a vehicle body front-rear direction.

Also, in the rear vehicle body structure according to an embodiment of the present invention, a plurality of horizontal ribs may be disposed on an extension line of a plurality of linear ribs formed inside the linear section.

Also, in the rear vehicle body structure according to an embodiment of the present invention, a plurality of linear ribs and a plurality of horizontal ribs may be disposed to be spaced apart from each other along a vehicle body front-rear direction.

Embodiments of the present invention may increase support strength and coupling strength of the rear suspension by the internal rib structure of the rear side member and the rear crash box, and the load input through the rear suspension and the rear crash load may be easily dispersed through multiple load passes.

In addition, effects obtainable or predicted by the embodiments of the present invention are disclosed directly or implicitly in the detailed description of the embodiments of the present invention. That is, various effects predicted according to embodiments of the present invention will be disclosed in the detailed description to be described later.

BRIEF DESCRIPTION OF THE DRAWINGS

Embodiments herein may be better understood by reference to the following description in connection with accompanying drawings in which like reference signs refer to identical or functionally similar elements.

It should be understood that the referenced drawings are not particularly illustrated according to scale, but present a brief expression of various preferred features illustrating a basic principle of the present invention. For example, specific design features of the present invention, which include a specific dimension, a specific direction, a specific position, and a specific shape will be partially determined according to a specific intended application and a specific use environment.

DETAILED DESCRIPTION OF ILLUSTRATIVE EMBODIMENTS

The terminology used herein is for the purpose of describing specific examples only and is not intended to be limiting of the disclosure.

As used herein, the singular forms are intended to include the plural forms as well, unless the context clearly indicates otherwise.

As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof.

As used herein, the term "and/or" includes any one or all combinations of one or more related items.

The term "coupled" denotes a physical relationship between two components in which components are directly or indirectly connected to each other through one or more intermediary components, by welding, self-piercing rivets (SPR), structural adhesives, and the like.

It is understood that the term "vehicle," "vehicular," "car," or other similar term as used herein is inclusive of, in general, passenger automobiles including sport cars, sports utility vehicles (SUV), buses, trucks, and various commercial vehicles, and is inclusive of hybrid vehicles, electric vehicles, hybrid electric vehicles, hydrogen-powered vehicles, purpose-built vehicles (PBV), and other alternative fuel vehicles (e.g., fuels derived from resources other than petroleum).

Hereinafter, an example of the present disclosure is described in detail with reference to accompanying drawing.

Figure 1:
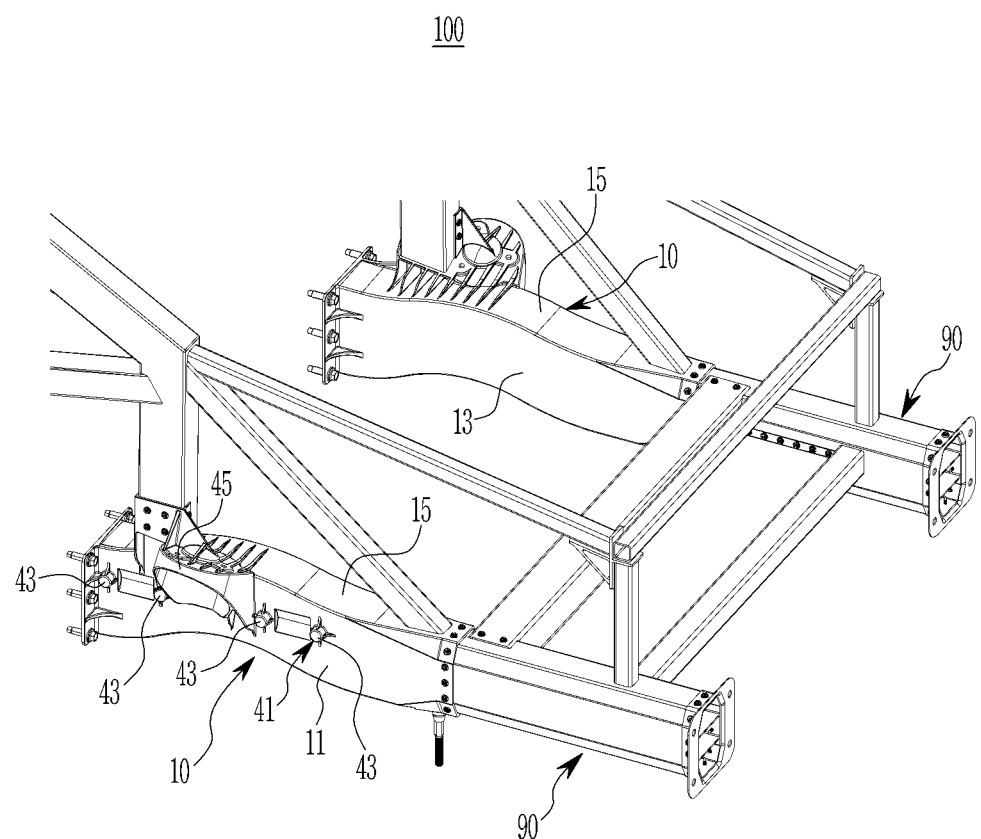
FIG. 1 is a perspective view of a rear vehicle body structure according to an embodiment of the present invention.
Figure 2:
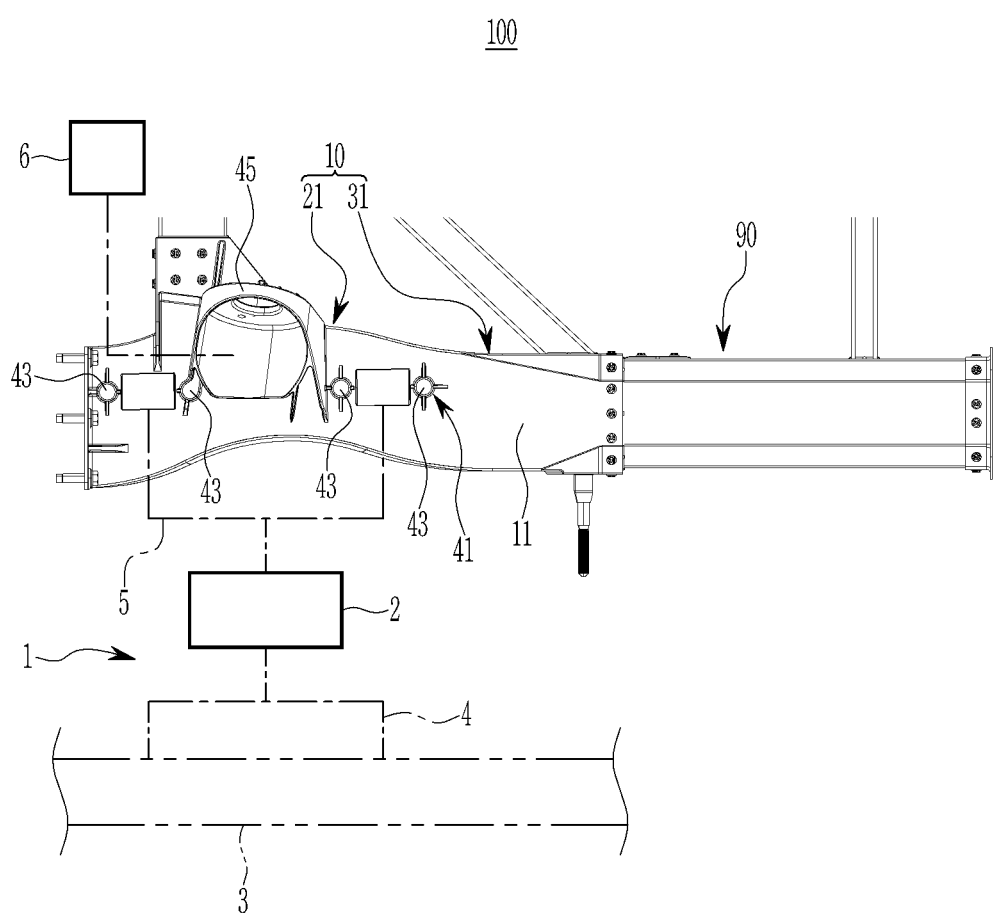
FIG. 2 is a side view showing a rear vehicle body structure according to an embodiment of the present invention.
Figure 3:
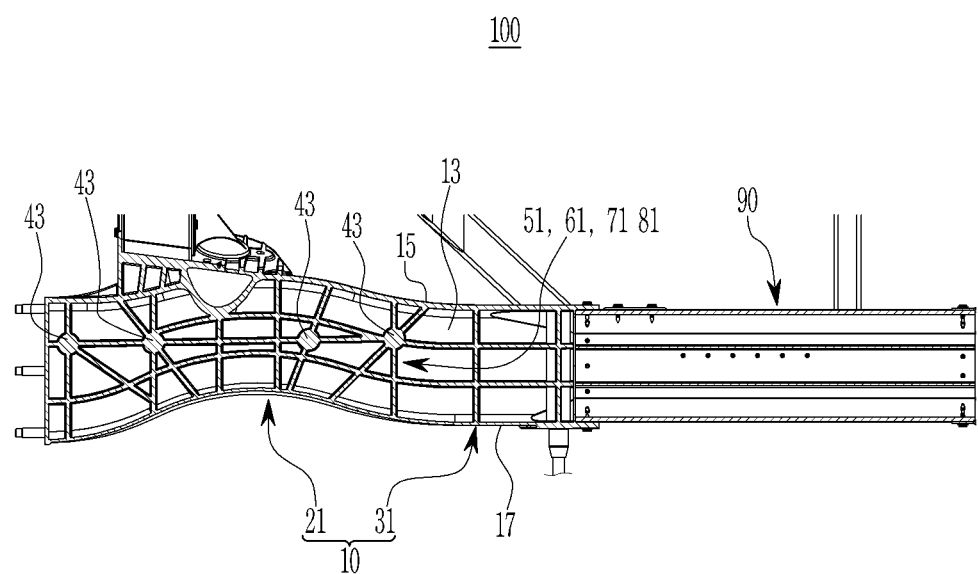
FIG. 3 is a cross-sectional view showing a rear vehicle body structure according to an embodiment of the present invention.

FIG. 1 is a perspective view of a rear vehicle body structure according to an embodiment of the present invention, FIG. 2 is a side view showing a rear vehicle body structure according to an embodiment of the present invention, and FIG. 3 is a cross-sectional view showing a rear vehicle body structure according to an embodiment of the present invention.

Referring to FIG. 1 to FIG. 3, the rear vehicle body structure 100 according to an embodiment of the present invention may be applied to the rear structure of the vehicle on which various rear structures are mounted.

Here, the rear suspension 1 may be mounted on the rear vehicle body structure 100. The rear suspension 1 may include a rear axle unit 2, a subframe 3, a lower arm 4, an upper arm 5, and a rear shock absorber 6.

In this specification, a 'vehicle front-rear direction' may be defined as a length direction of the vehicle body, a 'vehicle width direction' may be defined as the left and right direction of the vehicle body, and an 'up and down direction' may be defined as a height direction of the vehicle body.

In addition, in the present specification, an 'inward side in the width direction of the vehicle body' may be defined as an inner region (an inner surface) between components facing each other while being spaced apart from each other, and an 'outward side in the width direction of the vehicle body' may be defined as an outer region between the components.

Further, in this specification, the 'upper end portion', the 'upper portion', the 'upper end', or the 'upper surface' of a component may indicate the end portion, the portion, and the end or surface of a component positioned on a relatively upper side in the drawings, and the 'lower end portion', the 'lower portion', the 'lower end', or the 'lower surface' may indicate the end portion, the portion, or the end or surface of a component positioned on a relatively lower side in the drawings.

Furthermore, in this specification, an end of a component (e.g., one end or another end or the like) may indicate an end of the component in any one direction, and an end portion of a component (e.g., one end portion or the other end portion or the like) may indicate a certain portion of the component including its end.

The rear vehicle body structure 100 according to an embodiment of the present invention consists of a structure capable of increasing the coupling strength of the vehicle body rear structure and the dispersing performance of the rear crash load with a simple configuration.

For this, the rear vehicle body structure 100 according to an embodiment of the present invention basically includes a rear side member 10 and a rear crash box 90.

In an embodiment of the present invention, the rear side member 10 is disposed along the vehicle body front-rear direction on both sides along the vehicle width direction of the rear portion of the vehicle body, respectively. The upper arm 5 and the rear shock absorber 6 of the rear suspension 1 may be mounted to the rear side member 10 as mentioned above.

In one example, the rear side member 10 may be formed in a shape of a square cross-section. The rear side member 10 includes an outer surface 11 and an inner surface 13 along the vehicle width direction, and an upper surface 15 and a lower surface 17 along the vertical direction.

In another example, the rear side member 10 may be fabricated from an aluminum material. Furthermore, the rear side member 10 may be molded by sand mold casting of aluminum.

Figure 4:
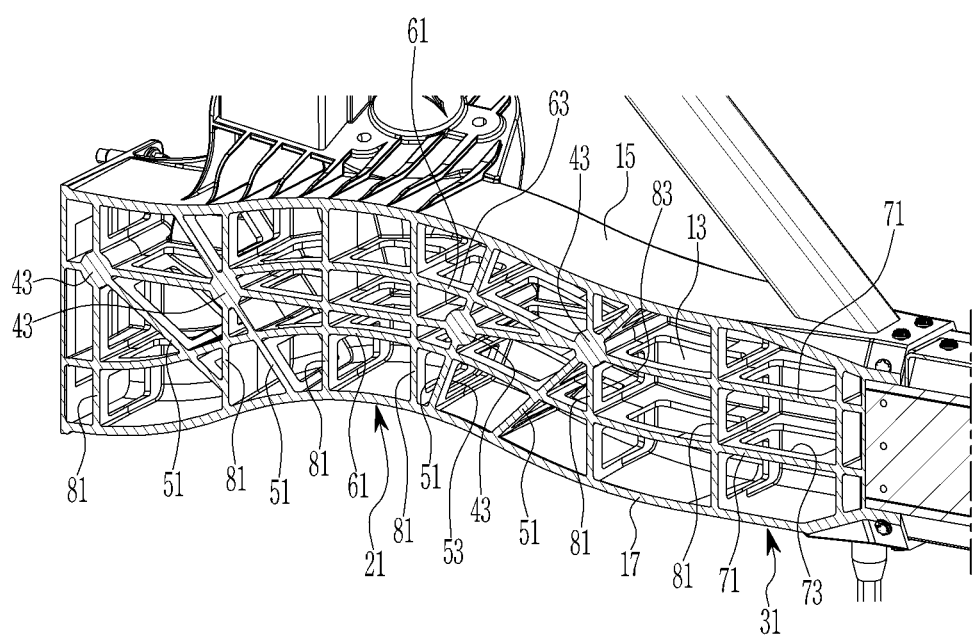
FIG. 4 is a cutaway perspective view showing a rear side member applied to a rear vehicle body structure according to an embodiment of the present invention.
Figure 5:
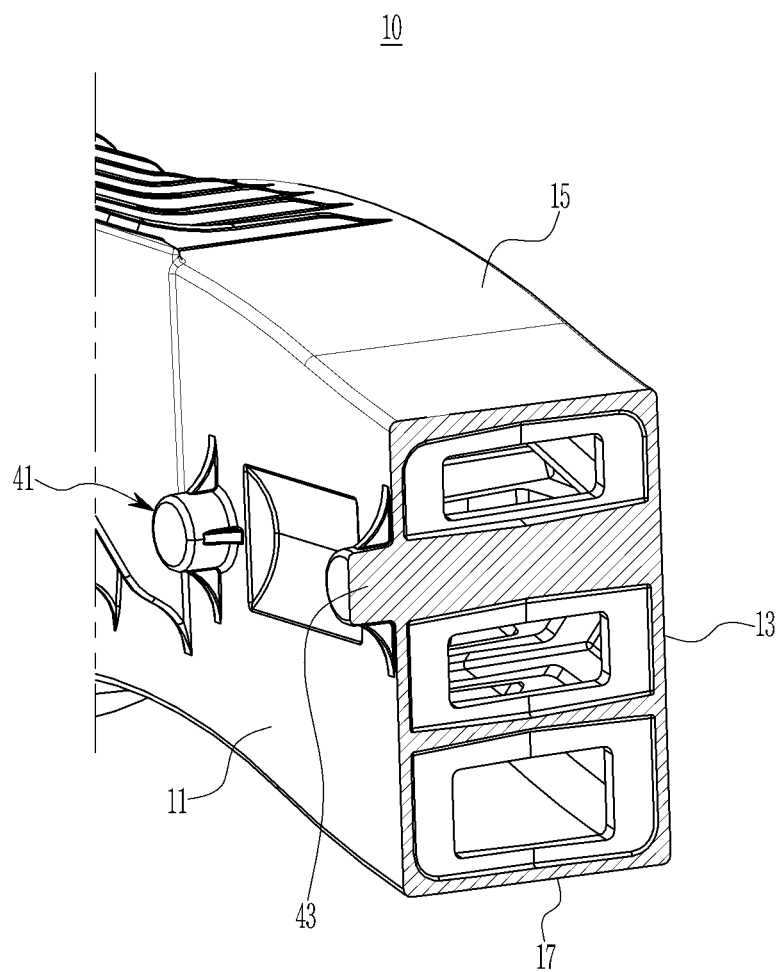
FIG. 5 and FIG. 6 are cross-sectional views showing a rear side member applied to a rear vehicle body structure according to an embodiment of the present invention.
Figure 6:
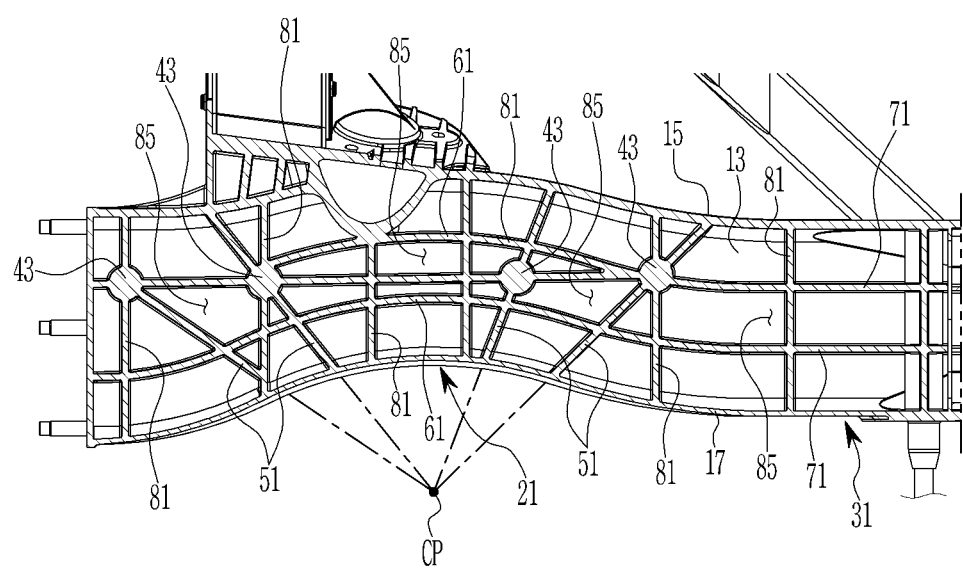

FIG. 4 is a cutaway perspective view showing a rear side member applied to a rear vehicle body structure according to an embodiment of the present invention, and FIG. 5 and FIG. 6 are cross-sectional views showing a rear side member applied to a rear vehicle body structure according to an embodiment of the present invention.

Referring to FIG. 1 to FIG. 6, the rear side member 10 according to an embodiment of the present invention includes a non-linear section 21 and a linear section 31.

The non-linear section 21 is designed to avoid mutual interference between the rear axle unit 2 of the rear suspension 1 and the front part of the rear side member 10. The non-linear section 21 is formed non-linearly at the front of the rear side member 10 along the vehicle body the front-rear direction. In one example, the non-linear section 21 may be formed in an arc shape (e.g., a round shape) having a predetermined curvature.

The linear section 31 is adapted to connect the rear portion of the rear side member 10 to the rear crash box 90, which will be described further later, along the vehicle body front-rear direction. The linear section 31 is connected to the non-linear section 21 and is formed in a linear shape along the vehicle body front-rear direction at the rear portion of the rear side member 10.

Furthermore, the rear side member 10 according to an embodiment of the present invention includes a plurality of suspension mounting parts 41 adapted to mount the rear suspension 1. A plurality of suspension mounting parts 41 may be formed in a non-linear section 21.

In one example, each of a plurality of suspension mounting parts 41 described above may include a mount boss 43 adapted to mount the upper arm 5 of the rear suspension 1.

The mount boss 43 is protruded outward in the vehicle width direction from the outer surface 11 of the rear side member 10, traverses the inside of the rear side member 10 along the vehicle width direction, and is connected to the inner surface 13 of the rear side member 10.

A reference numeral 45 in the drawings denotes a mounting bracket provided on the outer surface 11 of the rear side member 10. The mounting bracket 45 is adapted to mount the rear shock absorber 6 of the rear suspension 1.

Further, the rear side member 10 according to an embodiment of the present invention includes a plurality of radial ribs 51, a plurality of non-linear ribs 61, a plurality of linear ribs 71, and a plurality of vertical ribs 81.

A plurality of radial ribs 51, a plurality of non-linear ribs 61, a plurality of linear ribs 71, and a plurality of vertical ribs 81 are formed inside the rear side member 10 and are designed to increase the structure strength of the rear side member 10.

In an embodiment of the present invention, a plurality of radial ribs 51 are formed radially from each mount boss 43 of a plurality of suspension mounting parts 41.

These a plurality of radial ribs 51 are radially connected to each mount boss 43 from a predetermined center point CP to form the non-linear section 21.

In an embodiment of the present invention, a plurality of non-linear ribs 61 are formed non-linearly along the vehicle body front-rear direction inside the non-linear section 21.

A plurality of non-linear ribs 61 are disposed at a different angle from a plurality of radial ribs 51 and are connected to a plurality of radial ribs 51.

In an embodiment of the present invention, a plurality of linear ribs 71 are formed in a straight line along the vehicle body front-rear direction on the inside of the linear section 31 and disposed horizontally along the vehicle body front-rear direction.

A plurality of linear ribs 71 are disposed at a different angle from a plurality of radial ribs 51 and a plurality of non-linear ribs 61 and are connected to a plurality of radial ribs 51 and a plurality of non-linear ribs 61.

In addition, a plurality of vertical ribs 81 are formed in the non-linear section 21 and the linear section 31 along the vertical direction.

A plurality of vertical ribs 81 are connected in the vertical direction to a plurality of radial ribs 51, a plurality of non-linear ribs 61, and a plurality of linear ribs 71.

Here, a plurality of radial ribs 51, a plurality of non-linear ribs 61, a plurality of linear ribs 71, and a plurality of vertical ribs 81 are connected to the outer surface 11 and the inner surface 13 inside the rear side member 10 along the vehicle width direction. Then, a plurality of radial ribs 51 and a plurality of vertical ribs 81 are connected to the upper surface 15 and the lower surface 17 inside the rear side member 10.

Further, a plurality of radial ribs 51, a plurality of non-linear ribs 61, a plurality of linear ribs 71, and a plurality of vertical ribs 81 inside the rear side member 10 are disposed to be spaced apart from each other through a plurality of rib spaces 85.

Further, a plurality of rib spaces 85 are connected through rib holes 53, 63, 73, and 83 formed in a plurality of radial ribs 51, a plurality of non-linear ribs 61, a plurality of linear ribs 71, and a plurality of vertical ribs 81, respectively.

Referring to FIG. 1 to FIG. 3, in an embodiment of the present invention, the rear crash box 90 is disposed at the rear portion of the vehicle body. The rear crash box 90 is designed to connect the rear portion of the rear side member 10 and a rear bumper beam (not shown). In one example, the rear crash box 90 may be made by aluminum sand mold casting.

The rear crash box 90 is disposed on the rear portion of the rear side member 10 along the vehicle body front-rear direction and is connected (e.g., coupled) with the linear section 31 of the rear side member 10. In one example, the rear crash box 90 may be formed in the shape of a square cross-section.

Figure 7:
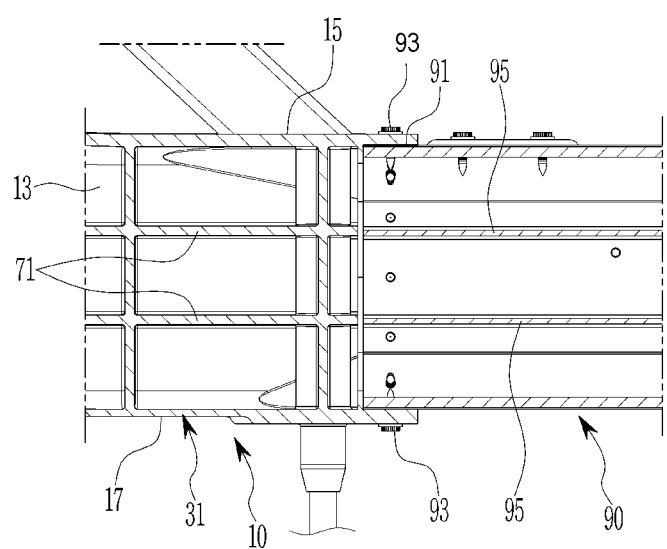
FIG. 7 is a cross-sectional view showing a connection structure of a rear side member and a rear crash box applied to a rear vehicle body structure according to an embodiment of the present invention.

FIG. 7 is a cross-sectional view showing a connection structure of a rear side member and a rear crash box applied to a rear vehicle body structure according to an embodiment of the present invention.

Referring to FIG. 7, the rear crash box 90 according to an embodiment of the present invention is inserted into the linear section 31 of the rear side member 10 as a male and female type.

The rear crash box 90 is joined with the linear section 31 via an adhesive 91 and a plurality of screws 93. Here, the plurality of screws 93 may be flow drill screws (FDS).

The rear crash box 90 includes a plurality of horizontal ribs 95 formed therein along the vehicle body front-rear direction.

A plurality of horizontal ribs 95 are disposed horizontally along the vehicle body front-rear direction inside the rear crash box 90. A plurality of horizontal ribs 95 are disposed on an extension line along the vehicle body front-rear direction of a plurality of linear ribs 71 formed inside the linear section 31.

Here, a plurality of linear ribs 71 and a plurality of horizontal ribs 95 are disposed to be spaced apart from each other along the vehicle body front-rear direction.

Hereinafter, an assembly process and operation of the rear vehicle body structure 100 according to an embodiment of the present invention configured as described above is described with reference to FIG. 1 to FIG. 7 in detail.

First, a rear side member 10 including a non-linear section 21 and a linear section 31 and made by aluminum sand mold casting is provided.

The rear side member 10 has inner ribs formed therein, and includes a plurality of radial ribs 51, a plurality of non-linear ribs 61, a plurality of linear ribs 71, and a plurality of vertical ribs 81.

Also, a rear crash box 90 including a plurality of horizontal ribs 95 formed therein and manufactured by aluminum sand mold casting is provided.

Meanwhile, a plurality of radial ribs 51, a plurality of non-linear ribs 61, a plurality of linear ribs 71, and a plurality of vertical ribs 81 of the rear side member 10 are spaced apart from each other by a plurality of rib spaces 85.

Also, a plurality of rib spaces 85 is connected to rib holes 53, 63, 73, and 83 formed in a plurality of radial ribs 51, a plurality of non-linear ribs 61, a plurality of linear ribs 71, and a plurality of vertical ribs 81, respectively.

Such a plurality of rib spaces 85 and the rib holes 53, 63, 73, and 83 may be used for position setting and fixing of a core, and for ejection of a molding sand during molding (e.g., sand casting) of the rear side member 10.

Furthermore, the rib holes 53, 63, 73, and 83 are disposed to be as far apart as possible from the outer surface 11 of the rear side member 10. That is, the rib holes 53, 63, 73, and 83 are disposed in a position close to the inner surface 13 of the rear side member 10.

Therefore, the setting of the position of the rib holes 53, 63, 73, and 83 as described above may minimize the effect on the structural strength of the rear side member 10.

On the other hand, the rear crash box 90 is inserted as the male and female type to the linear section 31 in the rear portion of the rear side member 10 and is coupled with the linear section 31 through an adhesive 91 and a plurality of screws 93.

Here, a plurality of horizontal ribs 95 of the rear crash box 90 are disposed on an extension line along the vehicle body front-rear direction of a plurality of linear ribs 71 formed inside the linear section 31.

The rear vehicle body structure 100 according to an embodiment of the present invention assembled as described above has a plurality of radial ribs 51, a plurality of non-linear ribs 61, a plurality of linear ribs 71, and a plurality of vertical ribs 81 inside the rear side member 10, thereby the supporting strength and the coupling strength of the rear suspension 1 may be increased.

Also, the rear vehicle body structure 100 according to an embodiment of the present invention easily disperses the load input to the rear side member 10 through the rear suspension 1 through multiple load passes by a plurality of radial ribs 51, a plurality of non-linear ribs 61, a plurality of linear ribs 71, and a plurality of vertical ribs 81.

Also, according to rear vehicle body structure 100 according to an embodiment of the present invention, as a plurality of horizontal ribs 95 of the rear crash box 90 are disposed on the extension line along the vehicle body front-rear direction of the linear ribs 71 of the rear side member 10, the crash load input at the time of a rear collision of the vehicle may be easily transferred to the rear side member 10.

In addition, according to the rear vehicle body structure 100 according to an embodiment of the present invention, since the linear ribs 71 of the rear side member 10 and a plurality of horizontal ribs 95 of the rear crash box 90 are disposed to be spaced apart along the vehicle body front-rear direction, it is possible to prevent an occurrence of noise due to interference between the linear ribs 71 and a plurality of horizontal ribs 95.

Further, according to the rear vehicle body structure 100 according to an embodiment of the present invention, as the rear side member 10 and the rear crash box 90 are manufactured by aluminum sand casting, it is possible to reduce the weight of the vehicle body and the manufacturing cost.

Furthermore, since the rear vehicle body structure 100 according to an embodiment of the present invention does not require separate reinforcement parts (e.g., connection parts) for the structural reinforcement of the rear side member 10 and the rear crash box 90, the number of parts of the vehicle body may be reduced.

While this invention has been described in connection with what is presently considered to be practical embodiments, it is to be understood that the invention is not limited to the disclosed embodiments. On the contrary, it is intended to cover various modifications and equivalent arrangements included within the spirit and scope of appended claims.

What is claimed is:

1. A rear vehicle body structure comprising:
   rear side members respectively disposed along a vehicle body front-rear direction on both sides of a vehicle body rear portion;
   a plurality of suspension mounting parts on each of the rear side members, the plurality of suspension mounting parts configured to mount a rear suspension,
   wherein each of the plurality of suspension mounting parts includes:
      a mount boss extending across an inside of the rear side member along a vehicle width direction and connected to an inner surface of the rear side member; and
      a plurality of radial ribs extending radially from each of the plurality of suspension mounting parts.

2. The rear vehicle body structure of claim 1, wherein each of the rear side members is formed of an aluminum material.

3. The rear vehicle body structure of claim 1, wherein each of the rear side members includes:
a non-linear section in a front portion along the vehicle body front-rear direction; and
a linear section on the vehicle body rear portion along the front-rear direction of the vehicle body and connected to the non-linear section.

4. The rear vehicle body structure of claim 3, wherein the plurality of radial ribs are radially connected to the plurality of suspension mounting parts from a predetermined center point.

5. The rear vehicle body structure of claim 3, wherein each of the rear side members includes:
a plurality of non-linear ribs extending along the vehicle body front-rear direction in the non-linear section and connected to the plurality of radial ribs; and
a plurality of linear ribs extending along the vehicle body front-rear direction in the linear section and connected to the plurality of radial ribs and the plurality of non-linear ribs.

6. The rear vehicle body structure of claim 5 further comprising:
a plurality of vertical ribs extending along a vertical direction, the plurality of radial ribs, the plurality of non-linear ribs, and the plurality of linear ribs being connected through the plurality of vertical ribs.

7. The rear vehicle body structure of claim 6, wherein the plurality of radial ribs, the plurality of non-linear ribs, the plurality of linear ribs, and the plurality of vertical ribs are spaced apart from each other through a plurality of rib spaces, the plurality of rib spaces being connected through rib holes formed in each of the plurality of radial ribs, the plurality of non-linear ribs, the plurality of linear ribs, and the plurality of vertical ribs.

8. The rear vehicle body structure of claim 3, further comprising:
a rear crash box on the vehicle body rear portion of the vehicle body along the vehicle body front-rear direction, the linear section being connected to the rear crash box.

9. The rear vehicle body structure of claim 8, wherein the rear crash box is inserted into the linear section as a male and female type and coupled to the linear section through an adhesive and a plurality of screws.

10. The rear vehicle body structure of claim 8, wherein the rear crash box includes:
a plurality of horizontal ribs therein along the vehicle body front-rear direction, the plurality of horizontal ribs on an extension line of a plurality of linear ribs in the linear section.

11. The rear vehicle body structure of claim 10, wherein the plurality of linear ribs in the linear section and the plurality of horizontal ribs in the rear crash box are spaced apart from each other along the vehicle body front-rear direction.

12. A rear vehicle body structure comprising:
rear side members extending along a vehicle body front-rear direction, the rear side members being on both sides of a vehicle body rear portion, each of the rear side members comprising:
a non-linear section comprising:
a plurality of non-linear ribs extending along the vehicle body front-rear direction;
a plurality of suspension mounting parts configured to mount a rear suspension; and
a plurality of radial ribs extending radially from each of the plurality of suspension mounting parts, the plurality of non-linear ribs being connected to the plurality of radial ribs; and
a linear section connected to the non-linear section, the linear section comprising a plurality of linear ribs extending along the vehicle body front-rear direction, the plurality of linear ribs being connected to the plurality of radial ribs and the plurality of non-linear ribs.

13. The rear vehicle body structure of claim 12, wherein each of the rear side members is formed of an aluminum material.

14. The rear vehicle body structure of claim 12, wherein each of the plurality of suspension mounting parts includes:
a mount boss on an outer surface of the rear side members, the mount boss extending across an inside of the rear side members along a vehicle width direction and being connected to an inner surface of the rear side members.

15. The rear vehicle body structure of claim 12, wherein the plurality of radial ribs are radially connected to the plurality of suspension mounting parts from a predetermined center point.

16. The rear vehicle body structure of claim 12 further comprising:
a plurality of vertical ribs extending along a vertical direction, the plurality of radial ribs, the plurality of non-linear ribs, and the plurality of linear ribs being connected through the plurality of vertical ribs.

17. The rear vehicle body structure of claim 16, wherein the plurality of radial ribs, the plurality of non-linear ribs, the plurality of linear ribs, and the plurality of vertical ribs are spaced apart from each other through a plurality of rib spaces, the plurality of rib spaces being connected through rib holes formed in each of the plurality of radial ribs, the plurality of non-linear ribs, the plurality of linear ribs, and the plurality of vertical ribs.

18. The rear vehicle body structure of claim 12, further comprising:
a rear crash box on the vehicle body rear portion of the vehicle body along the vehicle body front-rear direction, the linear section being connected to the rear crash box.

* * * * *